(12) United States Patent　　(10) Patent No.:　US 12,677,121 B2
Nakamura　　(45) Date of Patent:　Jul. 7, 2026

(54) IN-VEHICLE NETWORK SYSTEM AND ELECTRONIC CONTROL UNIT

(71) Applicant: TOYOTA JIDOSHA KABUSHIKI KAISHA, Toyota (JP)

(72) Inventor: Yoshihide Nakamura, Nagakute (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 28 days.

(21) Appl. No.: 19/034,834

(22) Filed: Jan. 23, 2025

(65) Prior Publication Data

US 2025/0386173 A1　　Dec. 18, 2025

(30) Foreign Application Priority Data

Jun. 13, 2024　(JP) ................................ 2024-095878

(51) Int. Cl.
*H04W 4/48*　　(2018.01)
*B60R 16/023*　　(2006.01)
*H04L 12/40*　　(2006.01)
*H04L 67/12*　　(2022.01)

(52) U.S. Cl.
CPC ............. *H04W 4/48* (2018.02); *B60R 16/023* (2013.01); *H04L 12/40* (2013.01); *H04L 67/12* (2013.01); *H04L 2012/40273* (2013.01)

(58) Field of Classification Search
None
See application file for complete search history.

(56) References Cited

U.S. PATENT DOCUMENTS

| | | | |
|---|---|---|---|
| 12,430,963 B2 * | 9/2025 | Kato | G07C 5/085 |
| 2013/0139018 A1 * | 5/2013 | Takada | H04L 1/08 |
| | | | 714/748 |
| 2021/0269050 A1 * | 9/2021 | Furuhashi | B60W 30/182 |
| 2022/0182258 A1 * | 6/2022 | Ishii | G06F 9/3891 |
| 2025/0254085 A1 * | 8/2025 | Koshimae | H04L 12/40 |
| 2025/0386173 A1 * | 12/2025 | Nakamura | H04L 67/12 |
| 2026/0027983 A1 * | 1/2026 | Sano | B60R 16/0231 |
| 2026/0058842 A1 * | 2/2026 | Hayashi | H04L 12/12 |

FOREIGN PATENT DOCUMENTS

JP　　2023-109566 A　　8/2023

* cited by examiner

*Primary Examiner* — Peter D Nolan
*Assistant Examiner* — Jacob Kent Besteman-Street
(74) *Attorney, Agent, or Firm* — SoraIP, Inc.

(57) ABSTRACT

The in-vehicle network system includes a first device, a second device, and a third device as electronic control units having a network management function. The first device transmits the periodic message. The second device performs a failure determination to determine that the first device has failed when the reception of the periodic message from the first device is interrupted. The third device has a partial network function. The first device transmits the standby notification to the second device when the first device shifts from the operation state to the standby state due to the fact that the operation notification is no longer received. When receiving the standby notification from the first device, the second device stops the failure determination for the first device.

5 Claims, 3 Drawing Sheets

IN-VEHICLE NETWORK SYSTEM AND ELECTRONIC CONTROL UNIT

CROSS-REFERENCE TO RELATED APPLICATION

This application claims priority to Japanese Patent Application No. 2024-095878 filed on Jun. 13, 2024, incorporated herein by reference in its entirety.

BACKGROUND

1. Technical Field

The present disclosure relates to an in-vehicle network system and an electronic control unit.

2. Description of Related Art

Japanese Unexamined Patent Application Publication No. 2023-109566 (JP 2023-109566 A) discloses an in-vehicle network system. The in-vehicle network system includes a plurality of electronic control units (ECUs). Hereinafter, the electronic control unit will be described as an ECU. The ECUs include an ECU that checks a destination address of a message when the message is received from another ECU, and an ECU that does not check the destination address of the message when the message is received from another ECU.

SUMMARY

An operation state in which communication with another ECU is possible and a standby state in which communication is stopped and power consumption is reduced are present in the ECU. The ECU has a network management function for shifting from the standby state to the operation state when operation is requested through the message. Hereinafter, the network management function will be described as an NM function. The ECUs having the NM function include an ECU having a partial network function and an ECU not having the partial network function. Hereinafter, the partial network function will be described as a PN function.

The ECU having the PN function transmits a PN message that contains information indicating a destination address. The PN message is transmitted in order to set another ECU having the PN function to the operation state. The ECU having the PN function checks the destination address of the PN message when the message is received. The ECU having the PN function comes into the operation state only when the message is a message addressed to itself.

The ECU not having the PN function transmits an NM message. The NM message is transmitted in order to set another ECU not having the PN function to the operation state. Regardless of whether the received message is the NM message or the PN message, the ECU not having the PN function comes into the operation state without checking the destination address.

In an in-vehicle network system, both the ECU having the PN function and the ECU not having the PN function may be connected to one communication bus. The ECU not having the PN function and connected to the communication bus comes into the operation state by receiving a PN message even if an NM message is not transmitted. At this time, the ECU not having the PN function and connected to another communication bus may be in the standby state because an NM message is not transmitted.

In this way, the ECU not having the PN function may come into the operation state even if another ECU not having the PN function is in the standby state. The ECU having the NM function has a function of determining that a monitoring target ECU has failed when periodic reception of messages from the monitoring target ECU is interrupted. Accordingly, when only some of the ECUs come into the operation state, the ECU not having the PN function in the operation state may erroneously determine that the monitoring target ECU in the standby state has failed.

To solve the above problem, an in-vehicle network system includes a first device, a second device, and a third device as electronic control units having a network management function for shifting from a standby state in which communication is not performed to an operation state in which the communication is possible when an operation notification that is a message for requesting operation is received.

In the in-vehicle network system, the first device is configured to transmit a periodic message that is a periodically transmitted message. In the in-vehicle network system, the second device is configured to perform failure determination for determining that the first device has failed when reception of the periodic message from the first device is interrupted. In the in-vehicle network system, the third device has a partial network function in which the standby state is not shifted to the operation state when the operation notification is received and is not addressed to the third device.

The in-vehicle network system includes:

a first communication bus connected to the first device;

a second communication bus connected to the second device and the third device; and a relay device. In the in-vehicle network system, the relay device is connected to the first communication bus and the second communication bus and is configured to relay messages exchanged between a plurality of communication buses.

In the in-vehicle network system, the first device is configured to, when the operation state is shifted to the standby state, transmit a standby notification that is a message indicating shifting to the standby state toward the second device. In the in-vehicle network system, the second device is configured to stop the failure determination on the first device when the standby notification is received from the first device.

To solve the above problem, an electronic control unit is a transmission-side electronic control unit in an in-vehicle network system. The in-vehicle network system includes, as electronic control units having a network management function for shifting from a standby state in which communication is not performed to an operation state in which the communication is possible when an operation notification that is a message for requesting operation is received:

the transmission-side electronic control unit;

a reception-side electronic control unit; and an electronic control unit having a partial network function. In the in-vehicle network system, the transmission-side electronic control unit is configured to transmit a periodic message that is a periodically transmitted message. In the in-vehicle network system, the reception-side electronic control unit is configured to perform failure determination for determining that the transmission-side electronic control unit has failed when reception of the periodic message from the transmission-side electronic control unit is interrupted. In the in-vehicle network system, the electronic control unit having the partial network function is configured not to shift the standby state to the operation state when the operation notification is received and is not addressed to the electronic control unit.

The in-vehicle network system includes:

a first communication bus connected to the transmission-side electronic control unit;

a second communication bus connected to the reception-side electronic control unit and the electronic control unit having the partial network function; and a relay device.

In the in-vehicle network system, the relay device is connected to the first communication bus and the second communication bus and is configured to relay messages exchanged between a plurality of communication buses.

The electronic control unit according to the present disclosure is configured to, when the operation state is shifted to the standby state, transmit a standby notification that is a message indicating shifting to the standby state toward the reception-side electronic control unit.

The in-vehicle network system and the electronic control unit described above can suppress erroneous failure determination by the second device that is the reception-side electronic control unit.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, an embodiment of an in-vehicle network system will be described with reference to FIGS. 1 to 3.

Configuration of the In-Vehicle Network System 100

Figure 1:
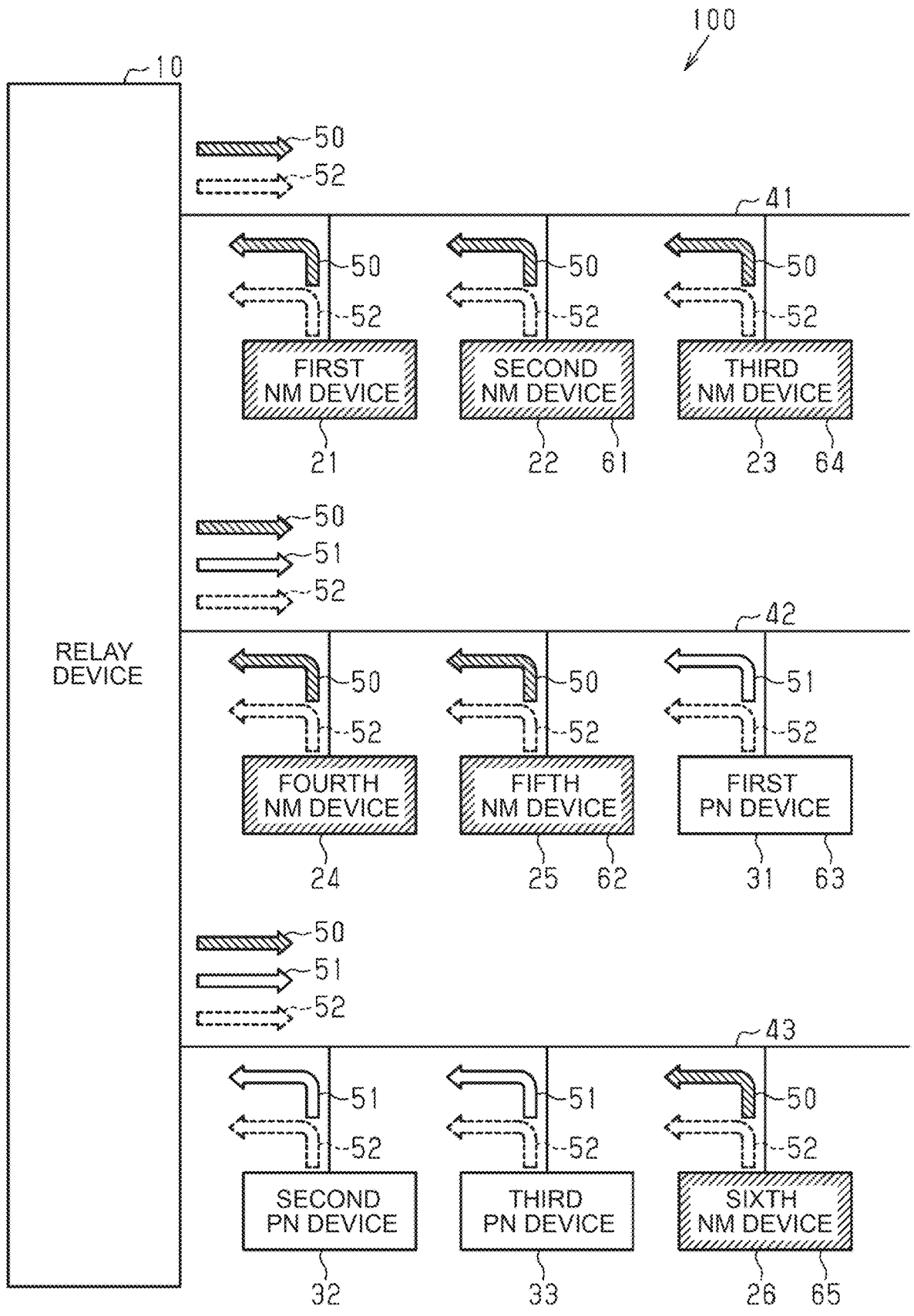
FIG. 1 is a schematic diagram illustrating a configuration of an in-vehicle network system according to an embodiment.

As illustrated in FIG. 1, the in-vehicle network system 100 includes a plurality of electronic control units (ECU: Electronic Control Unit). Hereinafter, the electronic control unit will be described as an ECU. ECU included in the in-vehicle network system 100 is divided into an ECU having a network management function and a relay device 10. Hereinafter, the network management function will be described as an NM function. In FIG. 1, each ECU is represented by a square.

When receiving the operation notification, ECU having NM function shifts from the standby state in which communication is not performed to the operation state in which communication can be performed. The operation notification is a message requesting the operation of ECU. In an ECU having a NM function, there are an ECU having a partial network function and an ECU having no partial network function. Hereinafter, the partial network function will be described as a PN function.

In the in-vehicle network system 100, ECU having PN function are the first PN device 31, the second PN device 32, and the third PN device 33.

In the in-vehicle network system 100, ECU having no PN function are the first NM device 21, the second NM device 22, the third NM device 23, the fourth NM device 24, the fifth NM device 25, and the sixth NM device 26.

As illustrated in FIG. 1, the in-vehicle network system 100 includes a first communication bus 41, a second communication bus 42, and a third communication bus 43. The first communication bus 41 is connected to the first NM device 21, the second NM device 22, and the third NM device 23. The second communication bus 42 is connected to the fourth NM device 24, the fifth NM device 25, and the first PN device 31. The third communication bus 43 is connected to second PN device 32, third PN device 33, and sixth NM device 26.

ECU in the in-vehicle network system 100 is connected so as to be capable of communication by transmission and reception of messages via a communication bus. In the in-vehicle network system 100, first NM device 21, second NM device 22, and third NM device 23 transmit and receive messages via the first communication bus 41. In the in-vehicle network system 100, fourth NM device 24, fifth NM device 25, and first PN device 31 transmit and receive messages via the second communication bus 42. In the in-vehicle network system 100, second PN device 32, third PN device 33, and sixth NM device 26 transmit and receive messages via the third communication bus 43.

In the in-vehicle network system 100, the relay device 10 is connected to all of the first communication bus 41, the second communication bus 42, and the third communication bus 43. The relay device 10 relays messages exchanged between the first communication bus 41, the second communication bus 42, and the third communication bus 43. For example, the relay device 10 receives the message transmitted by the first NM device 21 through the first communication bus 41. Then, the relay device 10 transmits the message received from the first NM device 21 toward ECU connected to the second communication bus 42 and the third communication bus 43.

ECU in the in-vehicle network system 100 implements certain functions in vehicles while communicating with other ECU. At this time, the combination of ECU for realizing a particular function in the in-vehicle network system 100 varies depending on the realized function. In addition, in the in-vehicle network system 100, a PN function ECU communicates with another ECU having a PN function to realize a particular function. On the other hand, in the in-vehicle network system 100, a PN function-free ECU communicates with another PN function-free ECU to realize a particular function.

When implementing a particular function, ECU in the in-vehicle network system 100 transmits an operation notification to another ECU that needs to be operated in order to realize the function.

As illustrated in FIG. 1, a PN message 51 is transmitted as an operation notification by an ECU having a PN function. A PN message 51 is transmitted by an ECU having a PN function in order to require the operation of another ECU having a PN function. At this time, PN message 51 is transmitted by ECU having PN function to which the identity of the destination ECU requesting the operation is attached.

On the other hand, as shown in FIG. 1, an ECU that does not have a PN function transmits a NM message 50 as an operation notification. A PN function-free ECU sends a NM message 50 to require operation of another ECU that also does not have a PN function. At this time, unlike ECU having PN function, ECU not having PN function transmits NM message 50 without adding the identity of the destination ECU requesting the operation.

ECU having PN function among ECU that has received the operation notification confirms the destination of the received operation notification. Then, when the operation notification is PN message 51 to which ECU has PN function, the operation notification shifts from the standby state to the operation state. On the other hand, when the operation notification is PN message 51 to which ECU having PN function does not have NM message 50 or the destination of the operation notification, it does not shift to the operation status.

An ECU having no PN function out of ECU that has received the operation notification transitions from the standby state to the operation state without confirming the destination of the received operation notification. That is, when the operation notification is received, even PN message 51 in ECU that does not have PN function, the operation notification, even NM message 50, the operation state from the standby state to the state.

As described above, when ECU having PN function transmits PN message 51, ECU having no PN function and ECU having PN function that is the destination of PN message 51 among ECU that has received the message are shifted to the operating status. On the other hand, when PN function-free ECU transmits NM message 50, only ECU that does not have PN function among ECU that received the message shifts to the operating status.

As described above, the relay device 10 relays messages exchanged between the plurality of communication buses. The relay device 10 transmits PN message 51 transmitted by ECU having PN function to a communication bus to which another ECU having PN function is connected. For example, when the first PN device 31 transmits PN message 51, the relay device 10 transmits PN message 51 to the third communication bus 43, which is the communication bus to which the second PN device 32 and the third PN device 33 are connected.

In addition, the relay device 10 transmits the NM message 50 transmitted by PN function-free ECU to the communication bus to which the other PN function-free ECU. For example, when the first NM device 21 transmits NM message 50, the relay device 10 transmits NM message 50 to the second communication bus 42 and the third communication bus 43. The second communication bus 42 is connected to the fourth NM device 24 and the fifth NM device 25. The third communication bus 43 is connected to the sixth NM device 26.

The relay device 10 also transmits NM message 50 and PN message 51. While receiving PN message 51 from another ECU, the relay device 10 relays PN message 51 and transmits PN message 51 to the communication bus to which ECU having PN function is connected. Therefore, as shown in FIG. 1, the relay device 10 transmits PN message 51 toward the second communication bus 42 and the third communication bus 43 while receiving PN message 51 from another ECU.

While receiving NM message 50 from another ECU, the relay device 10 relays NM message 50 and transmits NM message 50 to the communication bus to which ECU having no PN function is connected. Therefore, as illustrated in FIG. 1, the relay device 10 transmits NM message 50 to the first communication bus 41, the second communication bus 42, and the third communication bus 43 while receiving NM message 50 from another ECU.

As illustrated in FIG. 1, ECU in the in-vehicle network system 100 transmits a control message 52 in addition to PN message 51 and NM message 50. The control message 52 is a message transmitted by ECU to exchange data required to realize a particular function. For example, ECU transmits, to the other ECU, a control message 52 indicating the rotational speed of the vehicle. In the present embodiment, the control message 52 is a generic name of messages transmitted by the respective ECU in the in-vehicle network system 100 excluding the operation notification.

In the in-vehicle network system 100, second NM device 22, third NM device 23, and sixth NM device 26 transmit periodic message. The periodic message is a control message 52 periodically transmitted by the second NM device 22, the third NM device 23, and the sixth NM device 26. In the in-vehicle network system 100, the fifth NM device 25 receives the periodic message. The fifth NM device 25 determines that the second NM device 22 has failed when the reception of the periodic message from the second NM device 22 is interrupted. Further, the fifth NM device 25 determines that the third NM device 23 has failed when the reception of the periodic message from the third NM device 23 is interrupted. Then, the fifth NM device 25 determines that the sixth NM device 26 has failed when the reception of the periodic message from the sixth NM device 26 is interrupted. As described above, the fifth NM device 25 individually performs failure determination on the second NM device 22, the third NM device 23, and the sixth NM device 26.

Hereinafter, in the in-vehicle network system 100, the second NM device 22 is referred to as a first device 61. Further, in the in-vehicle network system 100, the third NM device 23 is referred to as a fourth device 64. In the in-vehicle network system 100, the sixth NM device 26 is referred to as a fifth device 65. The first device 61, the fourth device 64, and the fifth device 65 are ECU of the sender that transmit periodic message.

Hereinafter, ECU for executing the failure determination in the in-vehicle network system 100 will be referred to as a second device 62. In the in-vehicle network system 100, the fifth NM device 25 is the second device 62. The second device 62 is a receiving ECU that performs failure determination based on periodic message received from the transmitting ECU.

Hereinafter, in the in-vehicle network system 100, an ECU having a PN function connected to the same communication bus as the second device 62 is referred to as a third device 63. In the in-vehicle network system 100, the first PN device 31 is the third device 63.

Mode of Shifting ECU to the Standby Status in the In-Vehicle Network System 100

As described above, when implementing a particular function, ECU transmits an operation notification to another ECU that needs to be operated in order to realize the function. The respective ECU periodically send the operation notification until the implementation of the particular function is completed. Then, in an ECU where the implementation of the particular function is completed, the sending of the operation notification is stopped.

Figure 2:
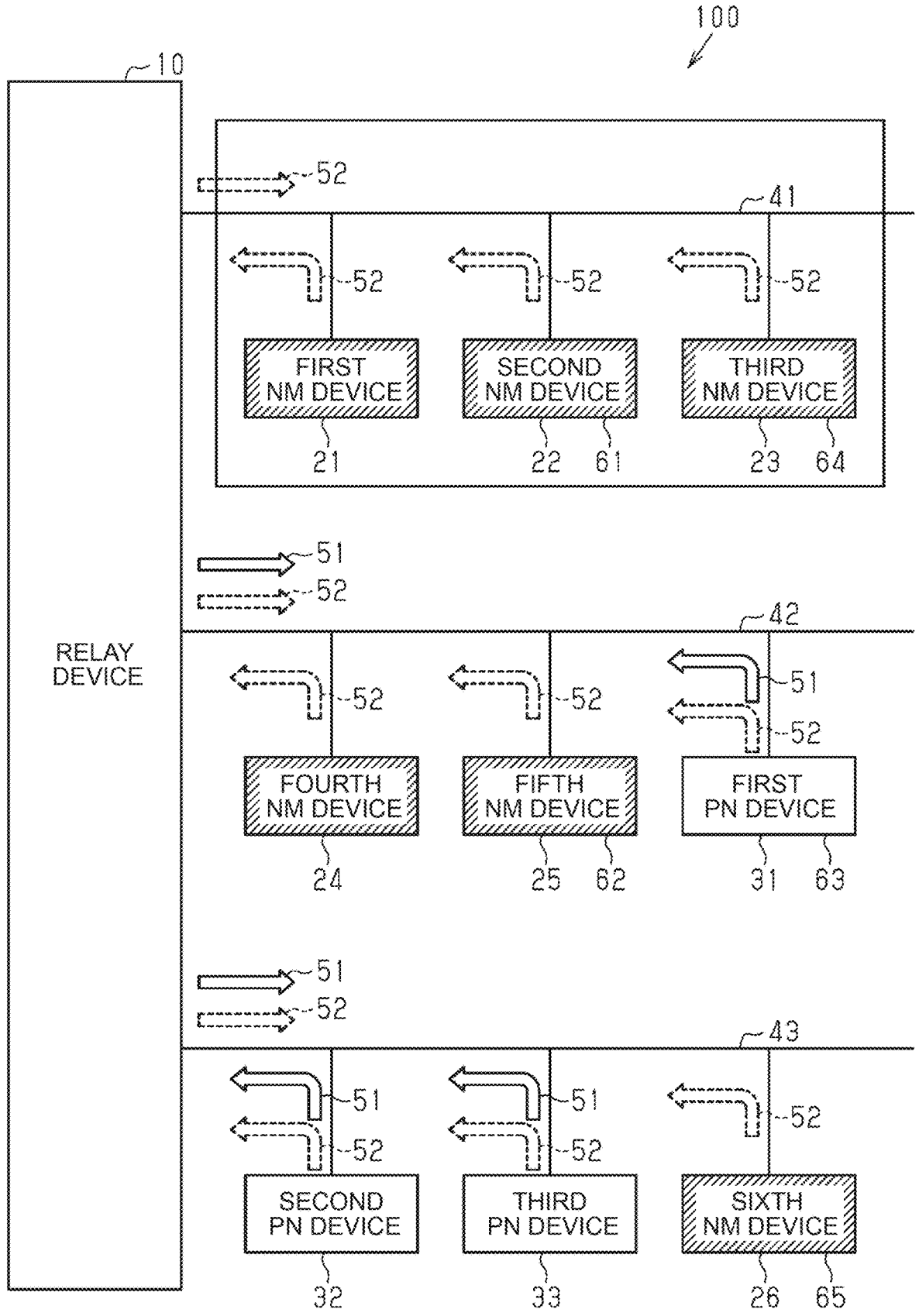
FIG. 2 is a schematic diagram showing a mode in which the electronic control unit in the first communication bus shifts to the standby state in the in-vehicle network system of FIG. 1.

FIG. 2 illustrates an aspect of the in-vehicle network system 100 illustrated in FIG. 1 in which an ECU having no PN function has completed implementation of a particular function. That is, in FIG. 2, all ECU that do not have a PN function have stopped transmitting NM message 50.

When all PN functions-free ECU stop transmitting NM message 50, the relay device 10 does not receive NM message 50 from another ECU. The relay device 10 that no longer receives NM message 50 stops transmitting NM message 50 itself.

ECU that has shifted to the operation state continues the operation state for a certain period of time each time the operation notification is received. Then, when the operation notification is no longer received from another ECU, the operation state shifts from the operation state to the standby state.

In the case shown in FIG. 2, ECU connected to the first communication bus 41 does not receive NM message 50 because all ECU that do not have PN function have stopped transmitting NM message 50. Further, as described above, the relay device 10 does not relay PN message 51 to ECU connected to the first communication bus 41. As described above, in the case illustrated in FIG. 2, ECU connected to the first communication bus 41 does not receive the operation notification. Therefore, ECU included in the area surrounded by the rectangle in FIG. 2 is shifted from the operating state to the standby state. As described above, in the case illustrated in FIG. 2, the first device 61 and the fourth device 64 are shifted to the standby state.

On the other hand, in the case illustrated in FIG. 2, ECU connected to the second communication bus 42 does not receive NM message 50 as in ECU connected to the first communication bus 41. However, as shown in FIG. 2, a first PN device 31, which is an ECU having a PN function, is connected to the second communication bus 42. Therefore, PN message 51 is transmitted to ECU connected to the second communication bus 42. Thus, in the case illustrated in FIG. 2, ECU connected to the second communication bus 42 continues to receive the operation notification even if NM message 50 is no longer transmitted. Therefore, in the case illustrated in FIG. 2, the fourth NM device 24, which is an ECU having no PN function, and the fifth NM device 25 continue to operate even if NM message 50 is not transmitted. Thus, in the case shown in FIG. 2, the second device 62 connected to the second communication bus 42 remains active even if NM message 50 is no longer transmitted because the third device 63 is connected to the communication bus to which it is connected.

Also, in the case illustrated in FIG. 2, ECU connected to the third communication bus 43 does not receive NM message 50 as in ECU connected to the first communication bus 41. However, as shown in FIG. 2, the third communication bus 43 is connected to the second PN device 32 and the third PN device 33, which are ECU having a PN function. Therefore, PN message 51 is transmitted to ECU connected to the third communication bus 43. As described above, in the case illustrated in FIG. 2, ECU connected to the third communication bus 43 continues to receive the operation notification even if NM message 50 is no longer transmitted. Therefore, in the case illustrated in FIG. 2, the sixth NM device 26, which is an ECU having no PN function, continues to operate even if NM message 50 is not transmitted. Thus, in the case shown in FIG. 2, the fifth device 65 connected to the third communication bus 43 remains active even if NM message 50 is no longer transmitted, similar to the second device 62.

In FIG. 2, the first device 61 and the fourth device 64 are shifted to the standby state, while the second device 62 is maintained in the operating state. In such a case, the first device 61 and the fourth device 64 that have shifted to the standby state do not transmit to the periodic message. At this time, the second device 62 that has no longer received the periodic message erroneously determines that the first device 61 and the fourth device 64 have failed.

On the other hand, in FIG. 2, the fifth device 65 maintains the operating state similarly to the second device 62. Therefore, in FIG. 2, since the fifth device 65 continues to transmit the periodic message, the second device 62 does not determine that the fifth device 65 has failed.

Communication Flow for Suppressing Erroneous Determination in Failure Determination by the Second Device 62

Figure 3:
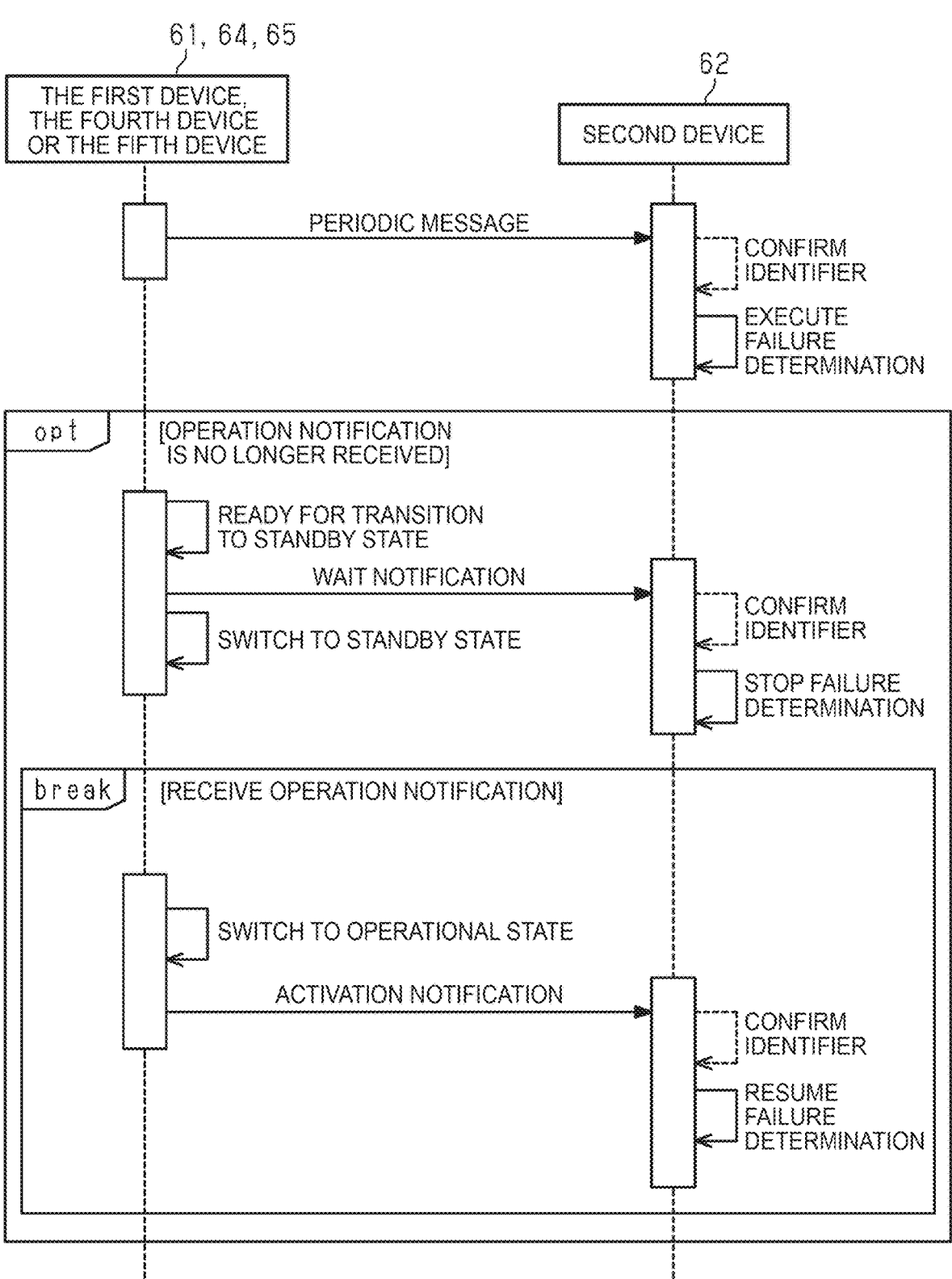
FIG. 3 is a sequence diagram illustrating an aspect of communication in the in-vehicle network system of FIG. 1.

FIG. 3 illustrates an aspect of communication performed by the first device 61 or the fourth device 64 or the fifth device 65 and the second device 62 for failure determination by the second device 62 in the in-vehicle network system 100. That is, the second device 62 performs communication with ECU of the first device 61, the fourth device 64, and the fifth device 65 in the manner shown in FIG. 3.

As illustrated in the upper part of FIG. 3, the first device 61, the fourth device 64, and the fifth device 65 transmit a periodic message during the operation state. At this time, the first device 61, the fourth device 64, and the fifth device 65 transmit a periodic message including an identifier that is information for identifying ECU of the transmission source. That is, the first device 61 transmits a periodic message including an identifier indicating the first device 61. The fourth device 64 transmits a periodic message including an identifier indicating the fourth device 64. Then, the fifth device 65 transmits a periodic message including an identifier indicating the fifth device 65.

As illustrated in the upper part of FIG. 3, the second device 62 that has received the periodic message confirms the identifier included in the periodic message. Then, the second device 62 performs failure determination on ECU indicated by the identifier. For example, when receiving the periodic message including the identifier indicating the first device 61, the second device 62 determines that the first device 61 has not failed.

As illustrated in the middle part of FIG. 3, the first device 61, the fourth device 64, and the fifth device 65 prepare for transition to the standby status when the operation notification is no longer received from another ECU. At this time, the first device 61, the fourth device 64, and the fifth device 65 determine that the operation notification has not been received from another ECU when the operation notification has not been received for a certain period of time.

As illustrated in the middle part of FIG. 3, the first device 61, the fourth device 64, and the fifth device 65 execute preparation for shifting to the standby state, and then transmit a standby notification to the second device 62. The wait notification is a message indicating that the waiting state is to be entered. The first device 61, the fourth device 64, and the fifth device 65 transmit the standby notification including the identifier. The first device 61, the fourth device 64, and the fifth device 65 shift to the standby state after transmitting the standby notification.

As illustrated in the middle part of FIG. 3, the second device 62 that has received the standby notification confirms the identifier included in the standby notification. Then, the second device 62 stops the failure determination for ECU indicated by the identifier. For example, when receiving the waiting notification including the identifier indicating the first device 61, the second device 62 stops the failure determination for the first device 61.

As illustrated in the lower part of FIG. 3, the first device 61, the fourth device 64, and the fifth device 65 transition to the operating status when the operation notification is received from another ECU. Then, the first device 61, the fourth device 64, and the fifth device 65 transmit the activation notification to the second device 62. The activation notification is a message indicating that the user has shifted to the operating state. The first device 61, the fourth device 64, and the fifth device 65 transmit the activation notification including the identifier.

As illustrated in the lower part of FIG. 3, the second device 62 that has received the activation notification confirms the identifier included in the activation notification. Then, the second device 62 resumes the failure determination for ECU indicated by the identifier. For example, when the activation notification including the identifier indicating the first device 61 is received, the second device 62 resumes the failure determination for the first device 61.

Operations of Present Embodiment

In the in-vehicle network system 100, the first device 61 notifies the second device 62 of the transition to the standby state through the standby notification. Then, in the in-vehicle network system 100, the second device 62 stops the failure determination for the first device 61 when the standby notification is received.

Effects of Present Embodiment (1) The in-vehicle network system 100 can suppress erroneous determination of a failure by the second device 62.

(2) In the in-vehicle network system 100, after transmitting the standby notification, when shifting from the standby state to the operation state, the first device 61 transmits an activation notification, which is a message indicating that the operation state has been shifted, to the second device 62. In the in-vehicle network system 100, after stopping the failure determination for the first device 61, the second device 62 resumes the failure determination for the first device 61 when receiving the activation notification from the first device 61.

In the in-vehicle network system 100, the first device 61 notifies the second device 62 of the transition to the operating state through the activation notification. Then, in the in-vehicle network system 100, the second device 62 resumes the failure determination for the first device 61 when the activation notification is received. Accordingly, the in-vehicle network system 100 can cause the second device 62 to resume the failure determination.

(3) The in-vehicle network system 100 has a NM function, is connected to the first communication bus 41, and includes a fourth device 64 that is an ECU for transmitting a periodic message, a waiting notification, and an activation notification to the second device 62. The first device 61 and the fourth device 64 transmit the periodic message, the standby notification, and the activation notification including information for identifying ECU of the transmission source. When receiving the periodic message, the second device 62 confirms ECU of the transmission source of the received periodic message, and performs failure determination on ECU of the transmission source of the received periodic message. When receiving the standby notification, the second device 62 confirms ECU of the transmission source of the received standby notification, and stops the failure determination with respect to ECU of the transmission source of the received standby notification. When receiving the activation notification, the second device 62 confirms ECU of the transmission source of the received activation notification, and resumes the failure determination with respect to ECU of the transmission source of the received activation notification.

In the in-vehicle network system 100, the second device 62 individually performs failure determination on a plurality of ECU connected to the same communication bus. Then, in the in-vehicle network system 100, the second device 62 performs stopping and resuming of failure determination individually for a plurality of ECU connected to the same communication bus. Accordingly, the in-vehicle network system 100 can suppress erroneous determination of a failure in each ECU while causing the second device 62 to individually perform failure determination on a plurality of ECU connected to the same communication bus.

(4) The in-vehicle network system 100 has a NM function, and includes a fifth device 65 that is an ECU for transmitting a periodic message, a standby notification, and an activation notification to the second device 62, and a third communication bus 43 that is connected to the fifth device 65 and the relay device 10. The first device 61 and the fifth device 65 transmit the periodic message, the standby notification, and the activation notification including information for identifying ECU of the transmission source. When receiving the periodic message, the second device 62 confirms ECU of the transmission source of the received periodic message, and performs failure determination on ECU of the transmission source of the received periodic message. When receiving the standby notification, the second device 62 confirms ECU of the transmission source of the received standby notification, and stops the failure determination with respect to ECU of the transmission source of the received standby notification. When receiving the activation notification, the second device 62 confirms ECU of the transmission source of the received activation notification, and resumes the failure determination with respect to ECU of the transmission source of the received activation notification.

In the in-vehicle network system 100, the second device 62 individually performs failure determination on a plurality of ECU connected to different communication buses. In the in-vehicle network system 100, the second device 62 stops and resumes the failure determination individually for a plurality of ECU connected to the communication buses. Accordingly, the in-vehicle network system 100 can suppress erroneous determination of a failure in each ECU while causing the second device 62 to individually perform failure determination on a plurality of ECU connected to the different communication buses.

(5) The first device 61, which is ECU of the transmitting side, notifies the second device 62, which is ECU of the receiving side, of the transition to the standby state when the transition from the operating state to the standby state is made. Accordingly, the first device 61, which is ECU of the transmitting side, can suppress erroneous determination of the failure by the second device 62, which is ECU of the receiving side.

Modifications

The present embodiment can be realized with the following modifications. The present embodiment and the following modifications can be combined with each other within a technically consistent range to be realized.

In the in-vehicle network system 100 described above, the relay device 10 transmits PN message 51 transmitted by ECU having PN function to the communication bus to which the other ECU having PN function is connected. In addition, the relay device 10 transmits PN function-free ECU to the communication bus to which the other NM having no communication function is connected, OOD message 50 transmitted by the communication bus.

On the other hand, the relay device 10 may not transmit the operation notification to the communication bus only when transmitting the operation notification to all the communication buses to which the relay device 10 is connected and shifting ECU connected to a part of the communication buses to the standby status.

As long as the in-vehicle network system 100 includes the first communication bus 41 including the first device 61, the second communication bus 42 including the second device 62 and the third device 63, and the relay device 10, the number of communication buses and the number of connected ECU are not limited to the above embodiment. The topology of the in-vehicle network system 100 is not limited to the above-described embodiment.

In the in-vehicle network system 100, an ECU having a PN function is not connected to the first communication bus 41. On the other hand, in the in-vehicle network system 100, an ECU having a PN function may be connected to the first communication bus 41 to which the first device 61 is connected.

The relay device 10 may adopt a configuration in which when receiving PN message 51 from another ECU, it confirms the destination of PN message 51 and transmits PN message 51 only to a communication bus connected to ECU serving as a destination. In this case, even if ECU having PN function is connected to the first communication bus 41, the operation notification is not transmitted to the first communication bus 41, and the operation notification is transmitted to the second communication bus 42.

In the in-vehicle network system 100, an ECU having a PN function is connected to the third communication bus 43. On the other hand, in the in-vehicle network system 100, ECU having PN function may not be connected to the third communication bus 43 to which the fifth device 65 is connected.

The in-vehicle network system 100 includes a first device 61, a fourth device 64, and a fifth device 65 as ECU for transmitting periodic message. The in-vehicle network system 100 may not include the fourth device 64. The in-vehicle network system 100 may not include the fifth device 65.

In the in-vehicle network system 100 described above, the first device 61, the fourth device 64, and the fifth device 65 may transmit the periodic message, the standby notification, and the activation notification without including the identifier. In this case, the second device 62 executes, stops, and resumes the failure determination without confirming the identifier included in the message.

In the in-vehicle network system 100, the first device 61, the fourth device 64, and the fifth device 65 transmit an activation notification. On the other hand, the first device 61, the fourth device 64, and the fifth device 65 may not transmit the activation notification. In this case, for example, after stopping the failure determination, the second device 62 does not restart the failure determination unless the second device 62 itself restarts.

What is claimed is:

1. An in-vehicle network system comprising:
as electronic control units having a network management function for shifting from a standby state in which communication is not performed to an operation state in which the communication is possible when an operation notification that is a message for requesting operation is received,
a first device configured to transmit a periodic message that is a periodically transmitted message, a second device configured to perform failure determination for determining that the first device has failed when reception of the periodic message from the first device is interrupted, and
a third device having a partial network function in which the standby state is not shifted to the operation state when the operation notification is received and is not addressed to the third device;
a first communication bus connected to the first device;
a second communication bus connected to the second device and the third device; and
a relay device connected to the first communication bus and the second communication bus and configured to relay messages exchanged between a plurality of communication buses, wherein
the first device is configured to, when the operation state is shifted to the standby state, transmit a standby notification that is a message indicating shifting to the standby state toward the second device, and
the second device is configured to stop the failure determination on the first device when the standby notification is received from the first device.

2. The in-vehicle network system according to claim 1, wherein:
the first device is configured to, when the standby state is shifted to the operation state after the standby notification is transmitted, transmit an activation notification that is a message indicating shifting to the operation state toward the second device; and
the second device is configured to resume the failure determination on the first device when the activation notification is received from the first device after the failure determination on the first device is stopped.

3. The in-vehicle network system according to claim 2, further comprising a fourth device that is an electronic control unit having the network management function, connected to the first communication bus, and configured to transmit the periodic message, the standby notification, and the activation notification to the second device, wherein
the first device and the fourth device are each configured to transmit the periodic message, the standby notification, and the activation notification each containing information for identifying a transmission-source electronic control unit, and
the second device is configured to:
when the periodic message is received, check a transmission-source electronic control unit of the received periodic message, and perform the failure determination on the transmission-source electronic control unit of the received periodic message;
when the standby notification is received, check a transmission-source electronic control unit of the received standby notification, and stop the failure determination on the transmission-source electronic control unit of the received standby notification; and
when the activation notification is received, check a transmission-source electronic control unit of the received activation notification, and resume the failure determination on the transmission-source electronic control unit of the received activation notification.

4. The in-vehicle network system according to claim 2, further comprising:
a fifth device that is an electronic control unit having the network management function and configured to transmit the periodic message, the standby notification, and the activation notification to the second device; and a third communication bus connected to the fifth device and the relay device, wherein the first device and the fifth device are each configured to transmit the periodic message, the standby notification, and the activation notification each containing information for identifying a transmission-source electronic control unit, and the second device is configured to:

when the periodic message is received, check a transmission-source electronic control unit of the received periodic message, and perform the failure determination on the transmission-source electronic control unit of the received periodic message;

when the standby notification is received, check a transmission-source electronic control unit of the received standby notification, and stop the failure determination on the transmission-source electronic control unit of the received standby notification; and when the activation notification is received, check a transmission-source electronic control unit of the received activation notification, and resume the failure determination on the transmission-source electronic control unit of the received activation notification.

5. An electronic control unit comprising a transmission-side electronic control unit in an in-vehicle network system, wherein the in-vehicle network system includes:

as electronic control units having a network management function for shifting from a standby state in which communication is not performed to an operation state in which the communication is possible when an operation notification that is a message for requesting operation is received, the transmission-side electronic control unit configured to transmit a periodic message that is a periodically transmitted message, a reception-side electronic control unit configured to perform failure determination for determining that the transmission-side electronic control unit has failed when reception of the periodic message from the transmission-side electronic control unit is interrupted, and an electronic control unit having a partial network function in which the standby state is not shifted to the operation state when the operation notification is received and is not addressed to the electronic control unit;

a first communication bus connected to the transmission-side electronic control unit;

a second communication bus connected to the reception-side electronic control unit and the electronic control unit having the partial network function; and a relay device connected to the first communication bus and the second communication bus and configured to relay messages exchanged between a plurality of communication buses, and the transmission-side electronic control unit is configured to, when the operation state is shifted to the standby state, transmit a standby notification that is a message indicating shifting to the standby state toward the reception-side electronic control unit.

\* \* \* \* \*